United States Patent

[11] 3,554,487

[72] Inventor Robert L. Vesco
 Denville, N.J.
[21] Appl. No. 838,005
[22] Filed June 16, 1969
[45] Patented Jan. 12, 1971
[73] Assignee International Controls Corp.
 Fairfield, N.J.
 a corporation of Florida. by mesne
 assignment
 Continuation of application Ser. No.
 584,821, Oct. 6, 1966, now abandoned.

[54] ROTARY VALVE WITH PIVOTABLE SEAT
 7 Claims, 7 Drawing Figs.
[52] U.S. Cl. .................................................. 251/298,
  251/86, 251/160, 251/363, 137/625.42
[51] Int. Cl. ..................................................... F16k 1/16
[50] Field of Search ........................................... 251/86, 87,
  159, 349—354, 84, 85, 334, 359, 153, 298, 218,
  369, 363, 364, 157, 160, 333, 170, 171;
  137/625.42

[56] References Cited
UNITED STATES PATENTS

| | | | |
|---|---|---|---|
| 2,961,006 | 11/1960 | Musser | 137/625.43 |
| 3,060,965 | 10/1962 | Taggart | 251/354X |
| 1,692,773 | 11/1928 | Friedman | 251/86X |
| 2,479,688 | 8/1949 | Lindgren | 251/86 |
| 2,603,231 | 7/1952 | Birkamoier | 251/363X |
| 2,840,108 | 6/1958 | Clymer | 251/363X |
| 3,189,046 | 6/1965 | Callahan et al. | 251/363X |

Primary Examiner—Walter A. Scheel
Assistant Examiner—Leon G. Machlin
Attorney—Nolte and Nolte ABSTRACT: A closeable valve port with sealing means angularly movable with respect to the valve port to achieve a complete seal of the valve port when the port is closed by an actuator which through wear or otherwise has its actuator surface means in nonjuxtaposed relation to valve port to be closed.

INVENTOR.
ROBERT L. VESCO
BY
Nolte and Nolte
ATTORNEYS

INVENTOR.
ROBERT L. VESCO
BY
Nolte and Nolte
ATTORNEYS

INVENTOR.
ROBERT L. VESCO
BY
*Nolte and Nolte*
ATTORNEYS 3,554,487

ROTARY VALVE WITH PIVOTABLE SEAT

This application is a continuation of Serial No. 584,821, filed October 6, 1966, now abandoned.

This invention relates generally to a dynamic valve seal, and more particularly to an improved rotary valve sealing actuator and means for adapting it to making a cm complete seal of a valve port.

Rotary valves are known in which a rotating valve actuator or rotating vane, is positioned between one of two or more ports within a cavity, thereby closing off one port while simultaneously permitting flow through other ports.

In known rotary valves, sealing means, such as rubber rings, are disposed about the rotating valve actuator, between the actuator and the valve housing. However, often this seal is imperfect thereby permitting undesired fluid to flow through a port. The sealing becomes less efficient over a long period of valve use as the sealing material, between the valve actuator and the valve housing, wears away, permitting increasingly more undesired fluid to flow through the port, when the valve actuator is in the position at which the port should be completely sealed to such fluid flow.

It is, therefore, an object of this invention to provide, in a valve, an improved means for sealing off the inlet and outlet ports so as to provide a firm seal between the port and the valve actuator.

It is a further object of this invention to provide a rotary valve in which the movement of the a valve actuator provides the sealing operation at the end of the stroke.

It is, still further, an object of the present invention to provide a valve in which the movement of the valve actuator against the inlet or outlet port activates a sealing device, completely sealing off the closed port from undesired fluid flow at the end of the stroke.

According to one aspect of the present invention, either the inlet or the outlet port has coupled thereto a ball joint by means of a socket arrangement. Connected to the ball joint is a flat plate, preferably disclike in form, with an aperture therein communicating with the port through a passage in the ball joint and the socket arrangement. The plate or disc has a wide freedom of angular movement due to the cooperation of the ball joint and the socket construction. The valve actuator, in its port closing movement, first contacts the plate which thereupon adjusts itself so as to be positioned flush against the surface of the valve actuator.

The contact between the plate and the valve actuator forms a substantially perfect seal to prevent fluid from flowing from, or into, the port, as the valve actuator is positioned to seal the port. Further sealing is effected by the provision of elastomeric rings around both the actuator and the plate. It is to be understood that the improved valve seal according to this invention may be employed in any type of valve including, for example, a rotary poppet, and spool valves.

The invention, from another aspect thereof, provides a flexible stationary valve seal around the respective inlet or outlet ports to cooperate with the valve actuator, so that upon rotation of the valve actuator to a port closing position thereof, the actuator will complete a seal tight connection with the valve seal.

From this specification, in which several embodiments of valves employing the improved valve seal are shown, further objects and features of the invention will become red readily apparent when studied together with the accompanying drawings in which.

Figure 5:
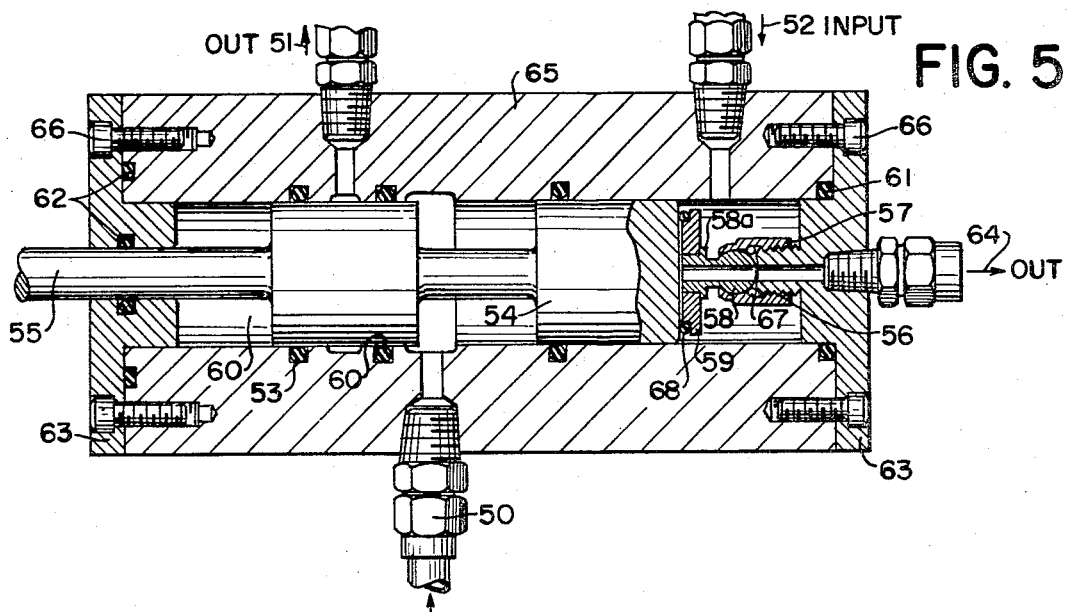
Figure 6:
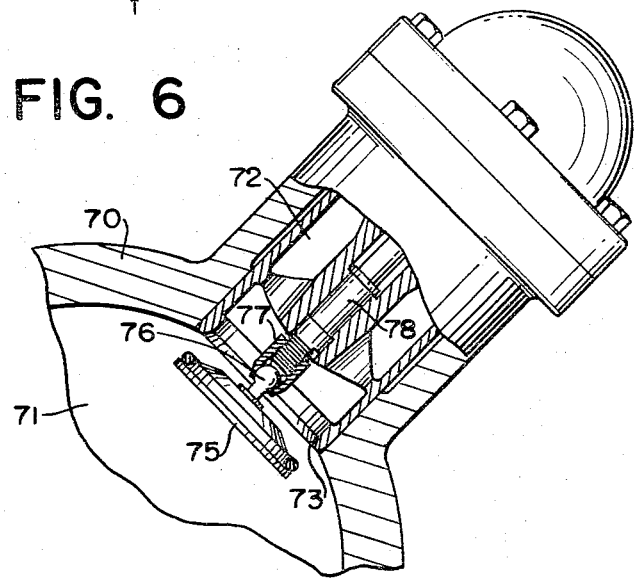
Figure 7:
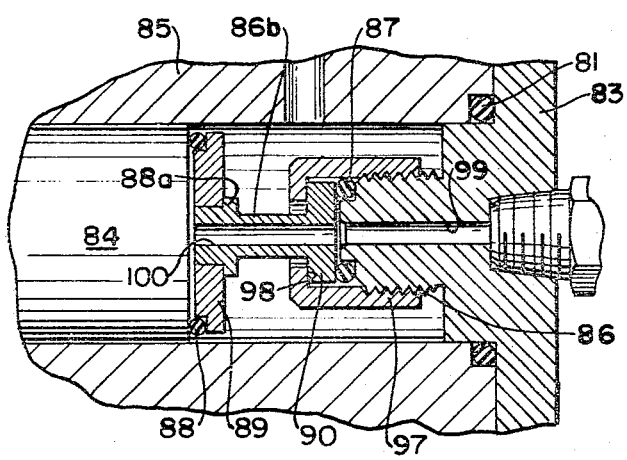

5. FIG. 5 is a longitudinal section showing the inventive valve seal as used in a spool valve;

FIG. 6 is a detailed view, partly in section, showing the inventive valve seal as used in a poppet valve; and FIG. 7 is a partial longitudinal section similar to FIG. 5, showing another construction of the inventive valve seal as used in a spool valve.

Figure 1:
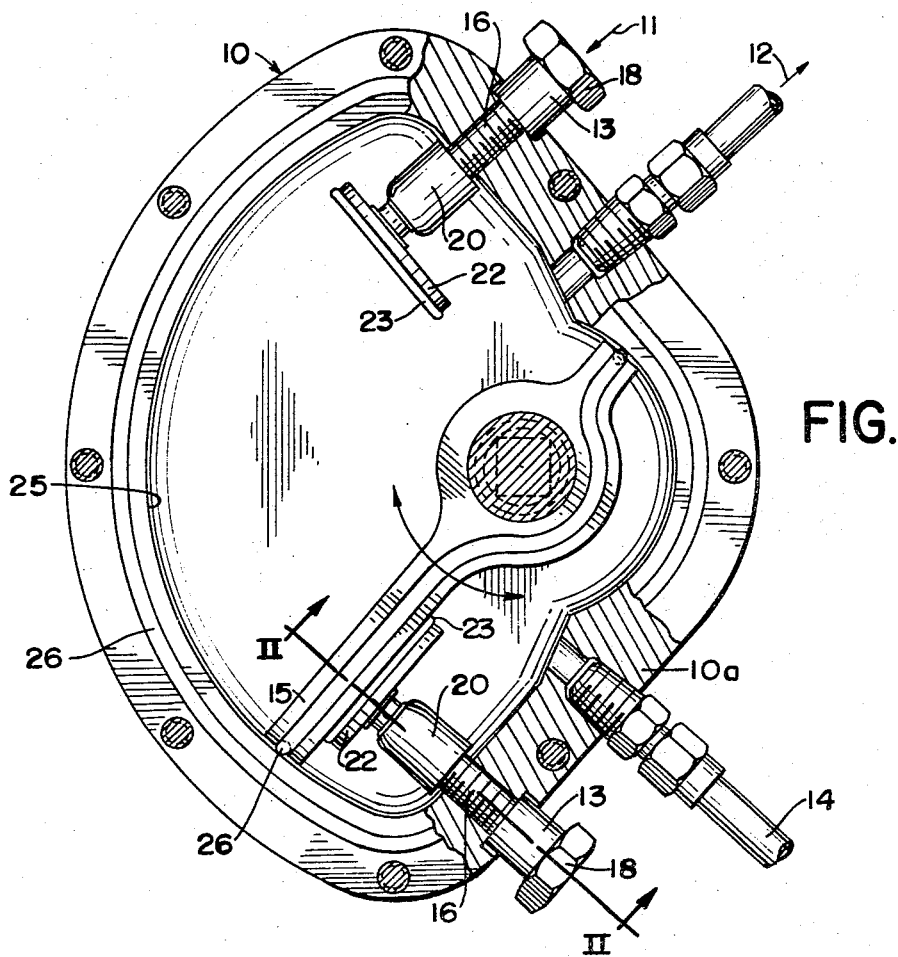
FIG. 1 is a top l plan view, partly in section of a rotary valve employing the inventive valve seal, showing the actuator closing off one port.
Figure 2:
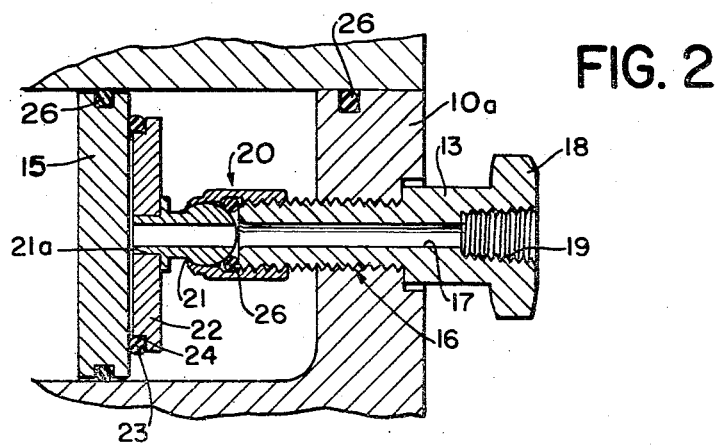
FIG. 2 is a view in section taken along line II–II of FIG. 1, showing the ball and socket structure of the valve seal, and showing the manner in which the seal is position ed against the valve actuator when the valve actuator closes off the port.

Referring first to the embodiment shown in FIGS. 1 and 2, there is shown a valve housing 10 having inlet ports 11 and 13 and the outlet ports 12 and 14. Mounted for pivotal movement within the housing 10 is a valve actuator or vane, 15, which rotates in the directions of the arrow.

The operation of the valve actuator permits the flow of fluid from inlet 11 to outlet 12, or from inlet 13 to outlet 14, depending on the position of the valve actuator 15. When the actuator 15 is in the position shown in FIG. 1, inlet 13 is sealed, and fluid flow from inlet 11 to outlet 12 is permitted. The valve seal is coupled to inlet port 12 13 in a manner to be described below, to cooperated cooperate with the valve actuator 15 to create a substantially fluid-tight seal.

The structure of actuator and the inventive valve seal, as coupled to a port such as inlet port 13, is shown in FIG. 1. The inlet port 13 comprises a threaded cylinder 16 which extends through the wall 10a of housing 10. Through the center of the inlet port 13, there is an axial passage 17 through which the fluid enters under external pressure. At the portion of the inlet port 13, which is external to the housing 10, there is provided a flange portion 18 having an inner threaded portion 19 to effectuate connection with an external conduit (not shown), which supplies the fluid into the valve housing 10. A socket 20 is threadedly secured to the end of the threaded cylinder 16 and a ball joint 21, which is free to pivot freely within socket 20, is carried within the socket and is retained therein by the inner surface of socket 20. A disc 22 is fixedly mounted upon an extension 21a of ball joint 21, so that the disc 22 is able to pivot freely with the ball joint 21. The disc member 22 contains a hollow passageway communicating through a passageway in the ball joint 21 with the passageway 17 of inlet port 13. An elastomeric O-ring 23 is disposed within a groove 24 which is provided around the periphery of disc 22. The sealing disc 22 may be eccentrically placed over the port, as shown, or it may conceivably be positioned with its center concentric with the longitudinal axis of the port.

The valve actuator 15 is rotatably moved by control means external to the cavity, which are not pertinent to the this invention and are therefore not shown.

The actuator comprises a tapered rectangular body which is dimensioned to fit snugly along opposite circular inner wall surfaces 25 of housing 10. To insure a seal between the actuator and the inner wall surfaces, an elastomeric or rubberized gasket 26 is placed around the entire perimeter of the valve actuator 15.

The operation of the inventive valve seal in cooperation with the actuator will now be described. The actuator 15 is rotated by control means (not shown) into position against either inlet port ll or 13. In FIG. 1, the valve actuator 15 is shown closing inlet port 13. The sealing disc 22, being able to move universally with the ball joint 21, is moved by the force of the actuator acting thereon until the surface of the sealing disc 22 becomes flush with the surface of the actuator 15 thereby creating a seal therebetween at the end of the stroke. O-ring 23 an d gasket 26 further perfect the seal. It is to be understood that the actuator and the sealing disc would work equally well if the inlet and outlet valves were interchanged so that the inlet valves were located at 12 and 14 and the sealing discs were connected to the outlet valve is located at 11 and 13. The basic nature of the invention would remain the same in either case.

From the foregoing, it is evident the invention makes it possible for the valve closing surface of the actuator to extend radially of its axis of rotation, or for this surface to extend at an angle to such direction. In any case, the actuator completes the seal while moving in an arcuate path and before its sealing surface reaches a position perpendicular to the axis of the passage which it seals.

Figure 4:
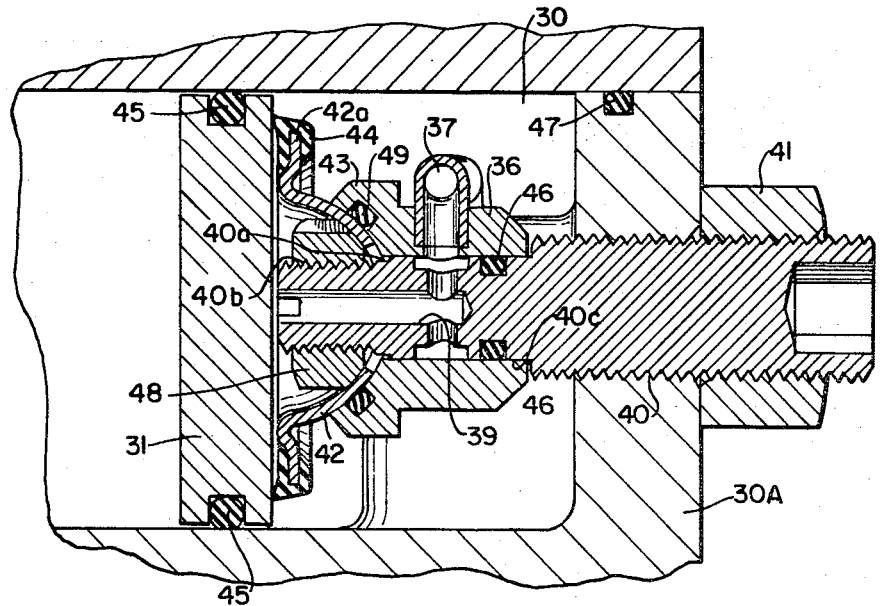
FIG. 4 is a view in section taken along the line IV–IV of FIG. 3, showing the construction of the valve seal and valve actuator.
Figure 3:
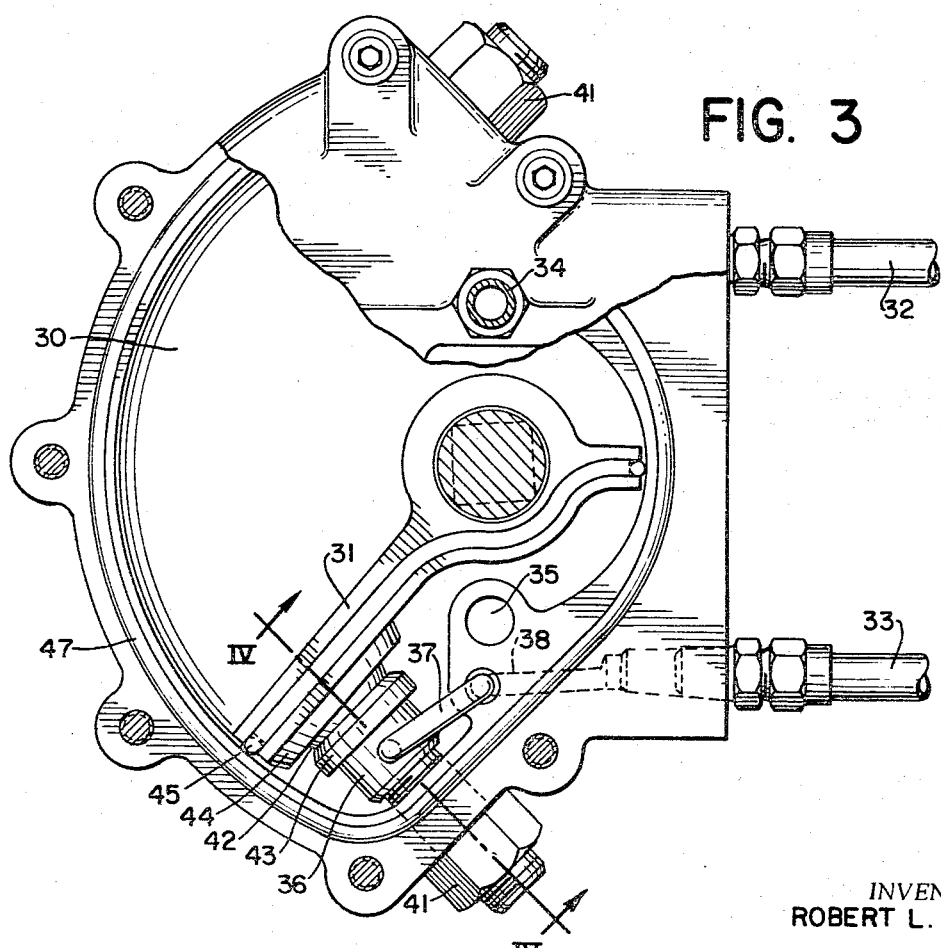
FIG. 3 is a view similar to FIG. 1 showing another embodiment of the invention.

Another embodiment of the invention is shown in FIGS. 3 and 4, in which is shown a differently formed actuator and a somewhat more complex seal construction than that shown in the embodiment of FIGS. 1 and 2. Here a valve actuator 31 is adapted to rotate within a valve housing 30. In this embodiment the two inlet ports are 32 and 33 and the corresponding outlet ports 34 and 35, are perpendicular to the inlet ports. The valve seal generally referred to as 36, is connected to the inlet port 33 by means of conduits 37 and 38. Conduit 37 connects with a passageway 39 within the seal 36.

The seal is shown in detail in section at view of FIG. 4. As shown, the seal comprises a threaded boy body portion 40 which is threadedly inserted through the wall of the valve housing 30. A nut 41 retains the seal member in position in the wall of the housing.

The threaded seal body portion 40 has an extension 40a which protrudes into the housing 30. The extension 40a has within it the passageway 39 which communicates with conduit 37 to complete the fluid path from the interior of valve housing 30 to the inlet port 33 when the actuator 31 does not seal the opening to passageway 39.

The extension 40a comprises a threaded portion 40b and an unthreaded portion 40c around which is place a collar 36a having a flange 43 at one end thereof. The inner portion of the flange 43 is spherically formed so as to receive a hemispherical valve seal 42 which is disposed around the extension 40a. The outer ends of the hemispherical valve seal 42 are bent over to form an extension 42a. An elastomeric ring 44 which may be made of rubber or plastic, for example, is placed around extension 41a and completely surrounds the hemispherical valve seal 42.

The elastomeric ring 44 is sufficiently flexible so that when the valve actuator 31 contacts the hemispherical seal 42 and the elastomeric sealing ring 44, the elastomeric sealing ring 44 compresses to form a substantially perfect seal between the valve actuator 31 and the hemispherical seal body 42. Fluid within the housing cannot now enter passageway 39 due to the seal so formed. A nut 48 is secured upon the threaded portion 40b of extension 40a to secure the hemispherical valve seal body 42 to the body portion 40.

Further sealing is provided by an elastomeric ring 49 between the hemispherical seal 42 and flange 43 and an a elastomeric O-ring 46 which is disposed around extension 40a, in a groove adapted therefor, the O-ring bearing upon collar 36a, Further, a gasket 45 is disposed about the perimeter of the valve actuator 31 and maintains a seal between the actuator and the inner surface of the wall of the valve housing 30. Still further, an O-ring 47 is disposed between the valve housing 30 and a closure plate 70. Thus, it can be seen that when the valve actuator 31 is rotated to the position shown in FIG. 3 the valve actuator 31, cooperating with the hemispherical seal 42 and the elastomeric ring 44 about the hemispherical seal 42 and the elastomeric ring 44 about the hemispherical seal, forms a substantially complete seal to prevent fluid from leaving the port 33 to enter the outlet port 35, thereby confining all fluid flow to the desired conduit path consisting of inlet 32 and outlet 34.

Here again, the actuator completes the seal while moving arcuately and before its sealing surface reaches a position at right angles to the axis of the axis of the passage to be sealed.

It is to be understood that the inventive valve seal structure may be used in other types of valve such as that shown in FIG. 5 in which the valve seal is shown in a spool valve, and in FIG. 6 which shows the inventive valve seal as used in a poppet valve.

Referring first to FIG. 5, a spool valve comprises spools 53 and 54 which are free to move horizontally within a bore 60 so as to open the path of fluid flow between inlet port 50 and outlet port 51, and between inlet port 52 and outlet port 64. The spools 53 and 54 are fixedly mounted on a shaft 55 which in turn is positioned in a horizontal position by external controls means not shown in the FIG.

Enclosure plated plates 63 are placed on either end of the valve housing 65 and fastened thereto by screws. A passageway is provided in one of the enclosure plates to provide a passage for the movement of the shaft 55.

Extending horizontally from the hub portion of the right hand enclosure plate is a threaded portion 56 from which a partially threaded collar member 57 is threadably fastened. That portion of collar member 57 which is not internally threaded comprises an arcuate receptacle portion which is adapted to receive a ball 58. Both the collar 57 and the ball 58 are provided with a hollow passageway therethrough so as to enable fluid to enter the outlet port 64.

Fixedly connected to extension 58a of the ball joint 58 is the inventive seal plate 59 which has a circular groove disposed on the periphery thereof which is adapted to receive a rubber O-ring 68, which is fixedly placed thereon. The seal 59 and O-ring 68 combination is adapted to fit in a seal tight arrangement against the front face of the spool 54 when the spool is positioned as shown in FIG. 5, so as to provide a substantially complete seal of fluid from inlet valve 52 to outlet valve 64.

Of course when the shaft 4 55 is moved towards the left in FIG. 5, so as to permit fluid flow from inlet 52 to outlet 64, spool member 53 operates to cut of off the flow of fluid from inlet 50 to outlet 51. Other O-ring generally designated 62, are placed between the various sections of the entire valve such as between shaft 55 and a closure plate 63, between the housing 65 and the enclosure plate 63, and surrounding the spools 53 and 54.

Despite the possible misalignment and possible angularity of the end face of the spool 54, a complete sealing of the outlet port 64 is effected.

In FIG. 6 a segment of a poppet valve is shown having a body 70, and chambers 71 and 72. The inventive valve seal 75 is shown cooperating with the chamfered valve seat 73. Valve seal 75 is fixedly engaged to a ball 76 which is free to move universally within a threaded retainer 77, and extends from a shaft 78 within the valve body 72. Upon activation of the valve the valve seal 75 is pulled up so as to sit flush within valve seat 73 so as to prevent the flow of fluid from chamber 71 to chamber 72. Misalignment of the shaft 78 will not prevent a complete sealing of the chamber 72 by the poppet valve.

In the embodiment of FIG. 7, there is no ball as in the embodiment of FIG. 5. The seal plate 89 is made integral with a transverse plate 90 within a partially threaded collar portion 97 threaded onto a threaded nipple 86 of the closure plate 83. Here the sealing adjustment is made by virtue of an O-ring 87 between the plate 90 and the end of the ripple 86.

I claim:

1. A valve having a valve actuator oscillatable within a valve housing having an inlet port and an outlet port, said actuator being mounted for effective closing of one port of the valve housing, and seal means having a passageway therethrough communicating with the valve port which the actuator closes, said seal means being angularly movably mounted on said housing between said valve port the actuator closes and the sealing face of said actuator, said seal means adapted to be moved into sealing engagement with said face when said face approaches the seal means at an angle to the longitudinal axis of the valve port, the port which the actuator closed including a nipple projecting into the valve chamber, and the seal means comprising a collar threaded upon the nipple having at one end an inner arcuate surface, a substantially hemispherical member having an axial opening therein disposed in contact with the arcuate surface, a flexible circular end portion of said hemispherical member extending away from the arcuate surface, and an elastomeric ring secured to the end portion of said hemispherical member for contacting the actuator.

2. A valve actuator oscillatable in an arcuate path within a valve housing having an inlet port and an outlet port, said actuator being mounted for effective closing of one port of the valve housing, and a seal means having a passageway therethrough communicating with the port which the actuator closes, said seal means being angularly movably mounted on said housing between said valve port which the actuator closes and the sealing face of said actuator, said seal means adapted to be moved into sealing engagement with said face while said actuator is moving toward the seal means.

3. The apparatus as claimed in claim 2, wherein the port which the actuator closes includes a nipple projecting into the valve chamber, and the seal means comprises a collar threaded upon the nipple having a passage therethrough, a ball held within said collar and having a passage therethrough in continuation of the passage in the nipple, a hollow stem on said ball extending away from said nipple, and an actuator contacting plate mounted upon the end of said hollow stem and pierced thereby whereby said plate has limited universal movement about said nipple to contact said actuator and be sealed thereby while the latter is moving to close the port.

4. The apparatus as claimed in claim 3, wherein said plate is a disc, and an elastomeric ring is disposed about the face of said disc with which said actuator contacts to complete the seal.

5. The apparatus as claimed in claim 2, wherein actuator comprises a tapered rectangular body, said actuator having an elastomeric ring disposed about the perimeter thereof in contact with the inner surfaces of the valve housing to maintain a seal between the actuator and the valve housing.

6. A valve having an actuator assembly comprising a sealed housing defining a chamber, a vane pivotally mounted within said a chamber for movement in an arcuate path, sealing means between said vane and the interior walls of said housing for slidably sealing said vane within said chamber, said chamber being shaped to conform to the movement of the periphery of said vane whereby said vane separates said chamber into first and second sealed regions, a separate port extending through the walls of said housing to each of said regions, a valve assembly in one of said regions connected to the port extending into said one region and operatively positioned with respect to said vane, said valve assembly comprising a valve disc having a central aperture, sealed ball and socket mounting means for mounting said valve disc with its aperture in communication with said port extending into said one region, sealing means on the periphery of said disc adapted to engage said vane in one extremity of movement thereof.

7. The actuator assembly of claim 6 further comprising an additional port extending through the wall of said enclosure to said one region.